(12) United States Patent
Yuan et al.

(10) Patent No.: US 12,220,668 B2
(45) Date of Patent: Feb. 11, 2025

(54) HIGH-FLUX SILICON CARBIDE CERAMIC FILTER MEMBRANE AND PREPARATION METHOD THEREOF

(71) Applicant: Nanjing Hanssen Material Technology Co., Ltd., Nanjing (CN)

(72) Inventors: Linfeng Yuan, Nanjing (CN); Johnny Marcher, Nanjing (CN)

(73) Assignee: Nanjing Hanssen Material Technology Co., Ltd., Nanjing (CN)

( * ) Notice: Subject to any disclaimer, the term of this patent is extended or adjusted under 35 U.S.C. 154(b) by 0 days.

(21) Appl. No.: 18/280,280

(22) PCT Filed: Apr. 20, 2022

(86) PCT No.: PCT/CN2022/087871
§ 371 (c)(1),
(2) Date: Sep. 5, 2023

(87) PCT Pub. No.: WO2022/228227
PCT Pub. Date: Nov. 3, 2022

(65) Prior Publication Data
US 2024/0033690 A1  Feb. 1, 2024

(30) Foreign Application Priority Data

Apr. 25, 2021 (CN) .......................... 202110448901.7
Apr. 25, 2021 (CN) .......................... 202110450376.2

(51) Int. Cl.
*B01D 67/00* (2006.01)
*B01D 63/06* (2006.01)
(Continued)

(52) U.S. Cl.
CPC ...... *B01D 67/00411* (2022.08); *B01D 63/061* (2013.01); *B01D 63/066* (2013.01);
(Continued)

(58) Field of Classification Search
None
See application file for complete search history.

(56) References Cited

U.S. PATENT DOCUMENTS 5,458,834 A * 10/1995 Faber ................ C04B 35/63404
264/109
6,187,256 B1 * 2/2001 Aslan .................... C04B 35/565
264/666

(Continued)

FOREIGN PATENT DOCUMENTS

CN    103721578 A    4/2014
CN    104261867 A    1/2015
(Continued)

*Primary Examiner* — Jason M Greene
*Assistant Examiner* — Eric J McCullough
(74) *Attorney, Agent, or Firm* — Bayramoglu Law Offices LLC

(57) ABSTRACT

A high-flux silicon carbide ceramic filter membrane and a preparation method thereof are provided. In the preparation method, a separation layer is directly coated at a time on the basis of a support, that is, after the support is sintered, the separation layer is directly coated and then sintered for carbon removal. In the present disclosure, a sintering process and a coating formula are optimized to prevent fine silicon carbide particles from entering micropores of a support due to capillary filtration and film formation during coating, such that a separation layer with an average pore size of 0.2 μm or less can be directly coated on a silicon carbide support with an average pore size of 10 μm or more, and fine silicon carbide particles can be effectively prevented from entering micropores of the support during the coating.

14 Claims, 8 Drawing Sheets

Single-coating of a separation layer

Sintering of a support

Application of a separation layer

Sintering of the separation layer

Oxidation of the separation layer

Support   ✱ Separation layer   ● Carbon

(51) Int. Cl.
  *B01D 69/02* (2006.01)
  *B01D 71/02* (2006.01)
  *C04B 35/565* (2006.01)
  *C04B 35/626* (2006.01)
  *C04B 35/634* (2006.01)
  *C04B 35/638* (2006.01)
  *C04B 35/64* (2006.01)
  *C04B 38/00* (2006.01)
  *C04B 41/00* (2006.01)
  *C04B 41/45* (2006.01)
  *C04B 41/50* (2006.01)
  *C04B 41/87* (2006.01)

(52) U.S. Cl.
  CPC ......... *B01D 67/0093* (2013.01); *B01D 69/02* (2013.01); *B01D 71/0215* (2022.08); *C04B 35/565* (2013.01); *C04B 35/6261* (2013.01); *C04B 35/63424* (2013.01); *C04B 35/63488* (2013.01); *C04B 35/638* (2013.01); *C04B 35/64* (2013.01); *C04B 38/0006* (2013.01); *C04B 38/0054* (2013.01); *C04B 38/0096* (2013.01); *C04B 41/0072* (2013.01); *C04B 41/4539* (2013.01); *C04B 41/4578* (2013.01); *C04B 41/5059* (2013.01); *C04B 41/87* (2013.01); *B01D 2323/081* (2022.08); *B01D 2325/02834* (2022.08); *B01D 2325/20* (2013.01); *C04B 2235/3826* (2013.01); *C04B 2235/5436* (2013.01); *C04B 2235/5445* (2013.01); *C04B 2235/5472* (2013.01); *C04B 2235/606* (2013.01); *C04B 2235/656* (2013.01); *C04B 2235/663* (2013.01)

(56) References Cited

U.S. PATENT DOCUMENTS

| | | | |
|---|---|---|---|
| 9,321,189 B1* | 4/2016 | Yamayose | C04B 35/62813 |
| 2003/0189269 A1* | 10/2003 | Makino | C04B 38/0006 264/211 |
| 2017/0232400 A1 | 8/2017 | Shiraishi et al. | |
| 2018/0312444 A1* | 11/2018 | Fekety | C04B 38/0009 |

FOREIGN PATENT DOCUMENTS

| | | |
|---|---|---|
| CN | 104261868 A | 1/2015 |
| CN | 104587846 A | 5/2015 |
| CN | 105126637 A | 12/2015 |
| CN | 105175005 A | 12/2015 |
| CN | 106731888 A | 5/2017 |
| CN | 108218464 A | 6/2018 |
| CN | 108329033 A | 7/2018 |
| CN | 113121241 A | 7/2021 |
| CN | 114345143 A | 4/2022 |
| FR | 3098730 A1 | 1/2021 |

* cited by examiner

HIGH-FLUX SILICON CARBIDE CERAMIC FILTER MEMBRANE AND PREPARATION METHOD THEREOF

CROSS REFERENCE TO THE RELATED APPLICATIONS

This application is the national phase entry of International Application No. PCT/CN2022/087871, filed on Apr. 20, 2022, which is based upon and claims priority to Chinese Patent Applications No. 202110448901.7, filed on Apr. 25, 2021, and No. 202110450376.2, filed on Apr. 25, 2021, the entire contents of which are incorporated herein by reference.

TECHNICAL FIELD

The present disclosure relates to the technical field of ceramic filter membranes, and in particular to a high-flux silicon carbide ceramic filter membrane and a preparation method thereof.

BACKGROUND

Like a ceramic membrane, a traditional silicon carbide membrane also has a sandwich structure including a support layer, an intermediate layer, and a separation layer. The support layer is a support for the membrane, and mainly ensures a mechanical strength of the membrane. The separation layer plays a role in actual filtration separation. Because a pore size of the support is often at least 25 times or more than a particle size of particles of the separation layer, in the existing process, the intermediate layer needs to be applied between the support layer and the separation layer to prevent the particles of the separation layer from penetrating into the support layer during the preparation of the separation layer. However, a flux is objectively reduced due to the presence of the intermediate layer, and micropore sizes of the support, the intermediate layer, and the separation layer of a traditional process are not much different from each other and are usually different from each other by 1 to 5 times, resulting in low flux and difficult flux improvement.

As shown in FIG. 1, the traditional preparation process of a silicon carbide ceramic membrane requires at least three times of sintering; and the traditional preparation process is relatively complicated and costly, and a product of the traditional preparation process has a low yield rate and a low flux due to multiple times of coating. In the traditional process, after each time of coating and high-temperature sintering (the sintering usually needs to be conducted at 2,000° C. to 2,400° C. under protection of an inert gas such as argon), high-temperature oxidation (the oxidation is conducted at 700° C. to 1,200° C. with air introduced) is required to remove carbon left after the high-temperature sintering, where the carbon comes from organic matters such as a binder and a dispersing agent in a green body or a coating slurry. If carbon is not removed, because carbon is hydrophobic, a solvent/water in a slurry is difficult to enter support pores through a capillary force during coating, such that a coating cannot be finally formed.

Therefore, in the traditional process, a product after high-temperature sintering needs to be oxidized. The carbon removal after oxidation allows a surface of a support to be hydrophilic and increases a pore size of the support relatively, which is conducive to entry of a solvent/water in a slurry into support pores through a capillary force to finally form a coating. However, in this case, a particle size of coating particles in a coating slurry needs to be large enough to prevent the coating particles from entering the support due to a capillary force.

SUMMARY

An objective of the present disclosure is to provide a preparation method of a high-flux silicon carbide ceramic filter membrane, where carbon removal is not required after sintering, that is, a support is not oxidized for carbon removal after sintering, but the residual carbon is retained. Specifically, a coating slurry and a preparation process are optimized to reduce a surface tension, such that the coating slurry can still be applied through a capillary force when a support is hydrophobic, and through a repulsion effect between like charges on a surface of a support and particles of a coating, fine particles of the coating are coated on a support with an average pore size of 10 μm or more.

In a first aspect of the present disclosure, a preparation method of a high-flux silicon carbide ceramic filter membrane is provided, including the following steps:
(1) preparing a multi-channel tubular green body, and sintering the multi-channel tubular green body at a high temperature to obtain a support having a microporous structure with a first average pore size;
(2) erecting the support, and introducing a coating slurry into channels from a bottom of the support obtained in step (1); when the coating slurry reaches a top of the support, keeping the coating slurry in the channels for a predetermined time; and releasing the coating slurry in the channels to form a channel coating, where particles of the coating slurry and a surface of the support carry like charges;
(3) drying the channel coating obtained in step (2);
(4) under protection of an inert atmosphere, sintering the channel coating at a high temperature to form a microporous structure with a second average pore size to produce a separation layer; and
(5) subjecting the separation layer obtained in step (4) to high-temperature oxidation sintering to remove residual carbon.

Preferably, a specific preparation process of the support includes the following steps:
mixing a silicon carbide powder having a first particle size mismatch ratio with a first additive and water, and subjecting a resulting mixture to extrusion molding to obtain the multi-channel tubular green body; and sintering the multi-channel tubular green body for recrystallization to form the microporous structure with the first average pore size on a wall of a channel.

Preferably, the silicon carbide powder having the first particle size mismatch ratio includes a silicon carbide powder I and a silicon carbide powder II, and a median particle size of the silicon carbide powder I is 5 to 30 times a median particle size of the silicon carbide powder II. More preferably, the median particle size of the silicon carbide powder I is 10 μm to 30 μm; and the median particle size of the silicon carbide powder II is 0.5 μm to 6 μm.

Preferably, the first additive includes a binder, a plasticizer, and a dispersing agent. More preferably, the silicon carbide powder I, the silicon carbide powder II, the binder, the plasticizer, the dispersing agent, and the water are in a mass ratio of (50-75):(10-20):(4-8):(1-3):(1-3):(10-20).

Preferably, before the multi-channel tubular green body is sintered at the high temperature, it further includes: drying the multi-channel tubular green body.

Preferably, the coating slurry is prepared by mixing a silicon carbide powder having a second particle size mismatch ratio, a second additive, and water; and the silicon carbide powder having the second particle size mismatch ratio includes a silicon carbide powder III and a silicon carbide powder IV, and a median particle size of the silicon carbide powder III is 3 to 8 times a median particle size of the silicon carbide powder IV.

Preferably, the median particle size of the silicon carbide powder III is 0.5 µm to 6 µm; and the median particle size of the silicon carbide powder IV is 0.1 µm to 3 µm.

Preferably, the second additive includes a binder, a plasticizer, a dispersing agent, a defoaming agent, and a surfactant; and the silicon carbide powder III, the silicon carbide powder IV, the binder, the plasticizer, the dispersing agent, the defoaming agent, the surfactant, and the water are in a mass ratio of (5-15):(5-15):(3-10):(5-15):(0-1.5):(0-1.5):(1-5):(50-80).

Preferably, the coating slurry has a pH of 6 to 10.

Preferably, before being introduced into the channels, the coating slurry is first pretreated as follows:
  adding alumina balls with a diameter of 8 mm to 10 mm, and conducting roll-milling for 12 h to 48 h.

Preferably, the coating slurry is introduced into the channels at a rate of 20 mm/s to 100 mm/s.

Preferably, in step (2), the predetermined time is 3 s to 15 s.

Preferably, the high-temperature sintering of the channel coating and the high-temperature sintering of the green body each include a degumming treatment. For example, under protection of an argon atmosphere, the green body or the channel coating is heated to 300° C. to 500° C. and kept at this temperature for 2 h to 5 h to allow degumming.

After the degumming is completed, high-temperature sintering is conducted to allow recrystallization of silicon carbide particles.

Preferably, a sintering temperature for recrystallization of the channel coating is lower than a sintering temperature for recrystallization of the green body. More preferably, the sintering temperature for recrystallization of the channel coating is 1,600° C. to 2,000° C.; and the sintering temperature for recrystallization of the green body is 2,000° C. to 2,400° C.

Preferably, particles in the coating slurry and a surface of the support carry like charges.

In a second aspect of the present disclosure, a high-flux silicon carbide ceramic filter membrane prepared by the preparation method of a high-flux silicon carbide ceramic filter membrane described above is provided, where the high-flux silicon carbide ceramic filter membrane includes a support and a separation layer, and does not include an intermediate layer.

Preferably, the first average pore size is 10 µm or more, and the second average pore size is 0.2 µm or less. More preferably, the second average pore size is 0.15 µm to 0.2 µm.

In a third aspect of the present disclosure, a high-flux silicon carbide ceramic filter membrane is provided, where the high-flux silicon carbide ceramic filter membrane includes a microporous support and a microporous separation layer, and does not include an intermediate layer; and an average pore size of micropores in the microporous support is 20 times or more an average pore size of micropores in the microporous separation layer.

Preferably, the average pore size of the micropores in the microporous support is 10 µm or more, and the average pore size of the micropores in the microporous separation layer is 0.2 µm or less.

Preferably, the average pore size of the micropores in the microporous separation layer is 0.15 µm to 0.2 µm.

Compared with the prior art, in the present disclosure, a preparation method of a ceramic filter membrane is adjusted and optimized to omit an intermediate layer and a preparation process of the intermediate layer in the traditional method; a formula of a coating slurry is optimized, such that oxidation for carbon removal is not conducted after sintering of a support, and the residual carbon can play a role of blocking micropores of the support to some degree, thereby reducing a probability of small silicon carbide particles of a separation layer to enter the micropores of the support; and a repulsion effect between like charges carried by particles of the coating slurry and a surface of the support prevents fine particles from entering the micropores of the support due to capillary filtration and film formation during coating.

With the optimized method of the present disclosure, a silicon carbide membrane separation layer with an average pore size of 150 nm can be directly coated on a silicon carbide support with an average pore size of 10 µm or more, and the preparation of a filter membrane can be completed through 2 times of sintering at an ultrafiltration application level, which avoids the deficiency that the existing ceramic filter membrane requires a multi-layer structure (a support, an intermediate layer, and a separation layer) and needs to be prepared through at least 3 times of sintering. In addition, due to the absence of preparation of the intermediate layer, the preparation method of the present disclosure greatly reduces a production cost and improves a product qualification rate.

The ceramic filter membrane prepared by the present disclosure only includes a silicon carbide support and a separation layer, and does not include an intermediate layer, that is, a separation layer with a high-rate pore size is successfully prepared on a support with a large pore size. Compared with the existing filter membrane products of the same pore size specifications, a flux of the ceramic filter membrane of the present disclosure can be greatly improved, and as tested, the flux can be improved by 30% or more.

It should be understood that all combinations of the above concepts and additional concepts that will be described in more detail below can be regarded as a part of the inventive subject matter of the present disclosure as long as these concepts are not contradictory. In addition, all combinations of the claimed subject matters are also regarded as a part of the inventive subject matter of the present disclosure.

BRIEF DESCRIPTION OF THE DRAWINGS

The identical or approximately identical components shown in the accompanying drawings may be represented by the same reference numerals. For the sake of clarity, not every component in each accompanying drawing is marked. The embodiments of various aspects of the present disclosure will be described below through examples and with reference to the accompanying drawings.

DETAILED DESCRIPTION OF THE EMBODIMENTS

In order to well understand the technical content of the present disclosure, the present disclosure is described below with reference to specific embodiments and the accompanying drawings.

Various aspects of the present disclosure are described with reference to the accompanying drawings in the present disclosure, and the accompanying drawings show many illustrated embodiments. The embodiments of the present disclosure are not intended to include all aspects of the present disclosure. It should be understood that the various concepts and embodiments described above and the concepts and implementations described in more detail below may be implemented in any of many ways, because the disclosed concepts and embodiments of the present disclosure are not limited to any implementation. In addition, some disclosed aspects of the present disclosure may be used alone or in any appropriate combination with other disclosed aspects of the present disclosure.

Figure 1:
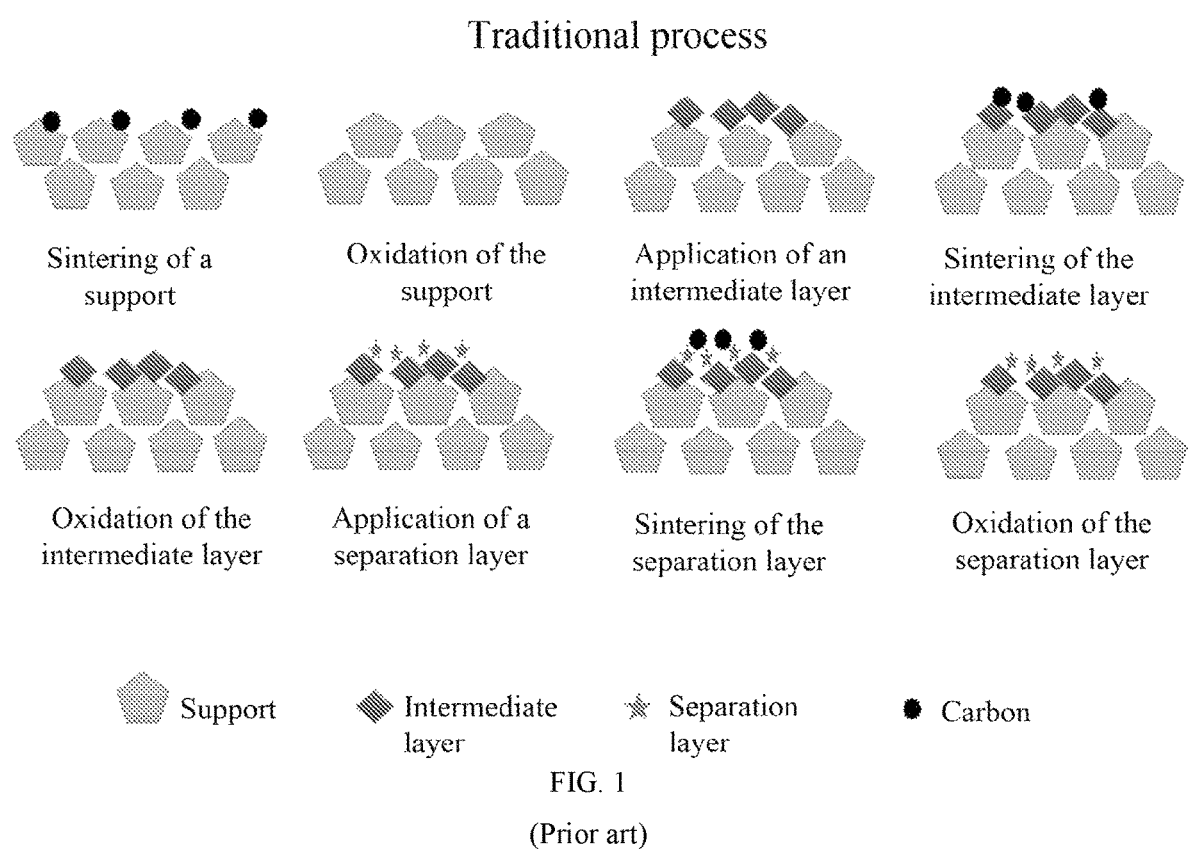
FIG. 1 shows a process route of preparation of a ceramic filter membrane through three-step sintering and oxidation in the existing traditional process.
Figure 6:
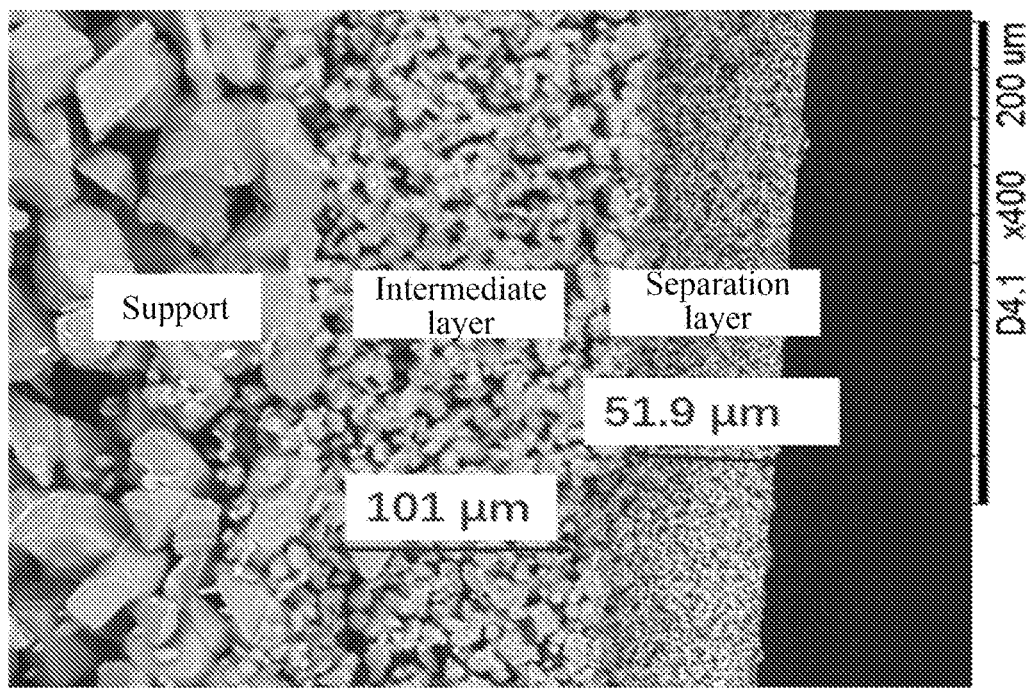
FIG. 6 is a schematic diagram of a ceramic filter membrane including a support, an intermediate layer, and a separation layer prepared by the conventional process shown in FIG. 1.

In the traditional preparation process of a ceramic filter membrane with a sandwich structure shown in FIG. 1, at least three times of sintering need to be conducted, and after each time of coating and high-temperature sintering, high-temperature oxidation needs to be conducted to remove carbon left after the high-temperature sintering. The traditional preparation process is relatively complicated and costly, and a product of the traditional preparation process has a low yield rate due to multiple times of coating. FIG. 6 is a schematic diagram of a ceramic filter membrane with a typical sandwich structure prepared by the traditional sintering process. The ceramic filter membrane has a typical structure including a support, an intermediate layer, and a separation layer, where an average pore size of the intermediate layer is about 2 times an average pore size of the separation layer; and the presence of the intermediate layer and the small pore sizes of the intermediate layer and separation layer reduce a flux of the ceramic filter membrane to some degree.

Figure 2:
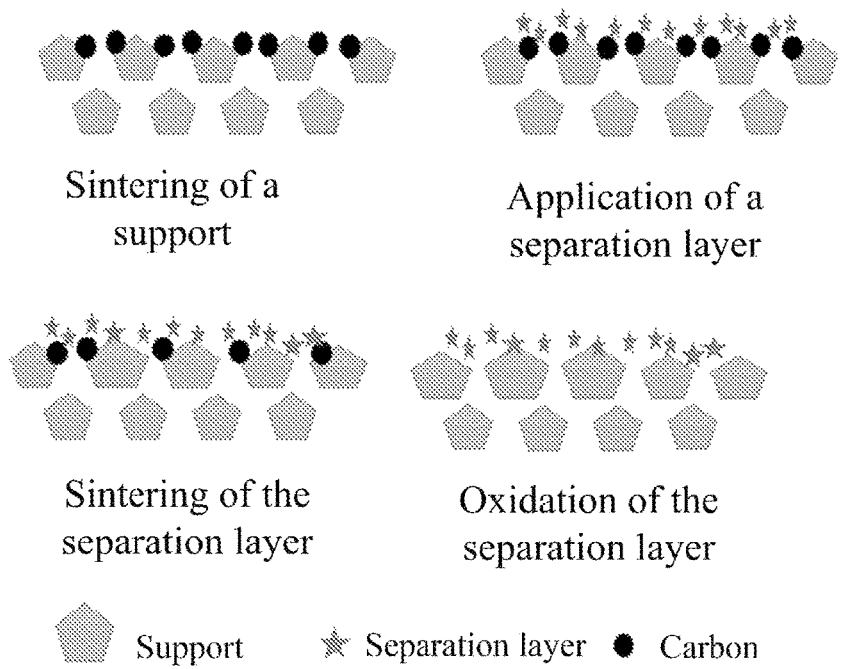
FIG. 2 shows a process route of preparation of a ceramic filter membrane without an intermediate layer in an exemplary embodiment of the present disclosure.

As shown in FIG. 2, the present disclosure is intended to provide an improved preparation method of a ceramic filter membrane, where an intermediate layer and a preparation process thereof are omitted; and a separation layer is directly coated at a time on the basis of a support, that is, after the support is sintered, the separation layer is directly coated and then sintered for carbon removal. A sintering process and a coating formula are optimized to prevent fine silicon carbide particles from entering micropores of a support due to capillary filtration and film formation during coating, such that a separation layer with an average pore size of 150 nm can be directly coated on a silicon carbide support with an average pore size of 10 μm or more, and fine silicon carbide particles in a coating slurry can be effectively prevented from entering pores of the support during the coating. As a result, the present disclosure can avoid the deficiency that the traditional preparation method of a ceramic filter membrane requires at least 2 times of coating (an intermediate layer is first coated on a support and then a separation layer is coated on the intermediate layer) and 3 times of sintering, thereby reducing a production cost and improving a product qualification rate. Due to the absence of an intermediate layer, a flux of a ceramic filter membrane of an equivalent pore size can be greatly increased.

The preparation method of the present disclosure is particularly suitable for preparation of a ceramic filter membrane in which a pore size of a support is 20 times or more larger than a pore size of a microporous structure of a separation layer, and the prepared ceramic filter membrane only includes a support with a large pore size and a separation layer attached to a surface of the support, where in particular, an average pore size (first pore size D1) of micropores in the support is 20 times or more an average pore size (second pore size D2) of micropores in the separation layer. In the following embodiments, the direct coating of a silicon carbide support having a microporous structure with an average pore size of 10 μm or more on a separation layer having a microporous structure with an average pore size of less than 0.2 μm is taken as an example for further illustration.

As shown in the accompanying drawings, an exemplary implementation of the preparation method of the present disclosure is specifically described.

Figure 3:
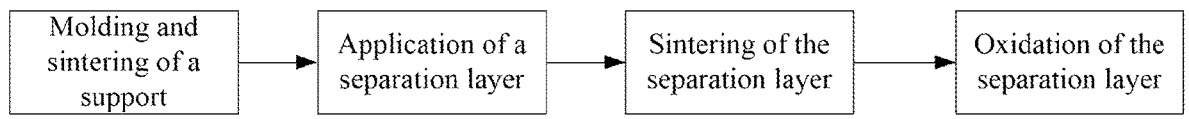
FIG. 3 is an example of a preparation method of a ceramic filter membrane in an exemplary embodiment of the present disclosure.

The preparation method shown in FIG. 3 includes: a multi-channel tubular green body is prepared and sintered at a high temperature to obtain a support having a microporous structure with a first average pore size; the support is erected, and a coating slurry is introduced into channels from a bottom of the support; when the coating slurry reaches a top of the support, the coating slurry is kept in the channels for a predetermined time; the coating slurry in the channels is released to form a channel coating, where particles of the coating slurry and a surface of the support carry like charges; the channel coating is dried; under protection of an inert atmosphere, the channel coating is sintered at a high temperature to form a microporous structure with a second average pore size to produce a separation layer; and the separation layer is subjected to high-temperature oxidation sintering to remove residual carbon.

As a specific example of the present disclosure, a preparation method of a high-flux and low-cost silicon carbide ceramic filter membrane includes:

a silicon carbide powder having a first particle size mismatch ratio is mixed with a first additive and water, and a resulting mixture is subjected to extrusion molding to obtain a multi-channel tubular green body; and the multi-channel tubular green body is sintered at a high temperature for recrystallization to form a microporous structure with a first average pore size on a wall of a channel, such that a support is obtained;

the support is erected, and a coating slurry is introduced into each channel from a bottom of the support; when the coating slurry reaches a top of the support, the coating slurry is kept in the channel for a predetermined time; and then the coating slurry in the channel is released to form a channel coating, where the coating slurry is prepared by mixing a silicon carbide powder with a second particle size mismatch ratio, a second additive, and water, and the coating slurry has a pH of 6 to 10;

the channel coating is dried;

under protection of a specified atmosphere, the channel coating is sintered at a high temperature to form a microporous structure with a second average pore size to produce a separation layer; and the separation layer is subjected to high-temperature oxidation sintering to remove residual carbon of the separation layer.

In particular, it is desirable that the multi-channel tubular green body is dried before recrystallization of the green body. For example, the multi-channel tubular green body is dried in a drying room for 24 h to 48 h, and environmental conditions in the drying room are controlled as follows: relative humidity: 20% to 60%, and temperature: 25° C. to 50° C. During the drying, hot air is introduced into channels of the green body at a flow rate of 0.5 m/s to 2 m/s.

Preferably, the silicon carbide powder having the first particle size mismatch ratio includes a silicon carbide powder I and a silicon carbide powder II, and a median particle size of the silicon carbide powder I is 5 to 30 times a median particle size of the silicon carbide powder II. In particular, the median particle size of the silicon carbide powder I is 10 µm to 30 µm; and the median particle size of the silicon carbide powder II is 0.5 µm to 6 µm.

For example, the first additive includes a binder, a plasticizer, and a dispersing agent. Preferably, the silicon carbide powder I, the silicon carbide powder II, the binder, the plasticizer, the dispersing agent, and the water are in a mass ratio of (50-75):(10-20):(4-8):(1-3):(1-3):(10-20).

Preferably, the binder may be methyl hydroxyethyl cellulose (MHEC) or polyvinyl alcohol (PVA); the plasticizer may be polyethylene glycol (PEG) or phthalate; and the dispersing agent may be an acrylic polymer.

Preferably, the silicon carbide powder having the second particle size mismatch ratio includes a silicon carbide powder III and a silicon carbide powder IV, and a median particle size of the silicon carbide powder III is 3 to 8 times a median particle size of the silicon carbide powder IV. In particular, the median particle size of the silicon carbide powder III is 0.5 µm to 6 µm; and the median particle size of the silicon carbide powder IV is 0.1 µm to 3 µm.

Preferably, the median particle sizes of the silicon carbide powder III and the silicon carbide powder IV each can be controlled to be 0.1 µm to 1.5 µm to effectively prepare a microporous structure with a pore size of 200 µm or less.

It should be understood that the median particle size in this embodiment of the present disclosure is also known as a particle size median.

For example, the second additive includes a binder, a plasticizer, a dispersing agent, a defoaming agent, and a surfactant; and the silicon carbide powder III, the silicon carbide powder IV, the binder, the plasticizer, the dispersing agent, the defoaming agent, the surfactant, and the water are in a mass ratio of (5-15):(5-15):(3-10):(5-15):(0-1.5):(0-1.5):(1-5):(50-80).

Preferably, the binder may be at least one selected from the group consisting of MHEC and PVA; the plasticizer may be PEG or phthalate; the dispersing agent may be an acrylic polymer; the defoaming agent may be a siloxane polyether; and the surfactant may be an alcohol.

Before being introduced into the channel, the coating slurry obtained by thoroughly mixing the components according to the aforementioned mass ratio is first pretreated as follows:

alumina balls with a diameter of 8 mm to 10 mm are added, and roll-milling is conducted for 12 h to 48 h.

Preferably, in some embodiments of the present disclosure, the coating slurry is introduced into the channel at a rate of 20 mm/s to 100 mm/s. More preferably, after reaching the top of the support, the coating slurry is kept for 3 s to 15 s to allow effective coating, such that a coating is formed through a capillary effect.

In this way, a formula of a coating slurry is optimized, such that oxidation for carbon removal is not conducted after sintering of a support, and the residual carbon can play a role of blocking micropores of the support to some degree, thereby reducing a probability of small silicon carbide particles of a separation layer to enter the micropores of the support; and a repulsion effect between like charges carried by particles of the coating slurry and a surface of the support prevents fine particles from entering the micropores of the support due to capillary filtration and film formation during coating.

Optionally, during preparation of a coating slurry, a variety of manners can be adopted to make particles (silicon carbide particles) and a surface of a support carry like charges, for example, one or more selected from the group consisting of fluid (slurry) characteristic adjustment and pH adjustment may be adopted.

For example, when a coating slurry for a separation layer is prepared by mixing a silicon carbide powder with a second particle size mismatch ratio, a second additive, and water, a pH of the slurry can be controlled to be 6 to 10, such that particles in the coating slurry and a surface of a support carry like charges, and the particles in the coating slurry are prevented from entering pores of the support through a repulsion effect between the like charges.

Figure 4:
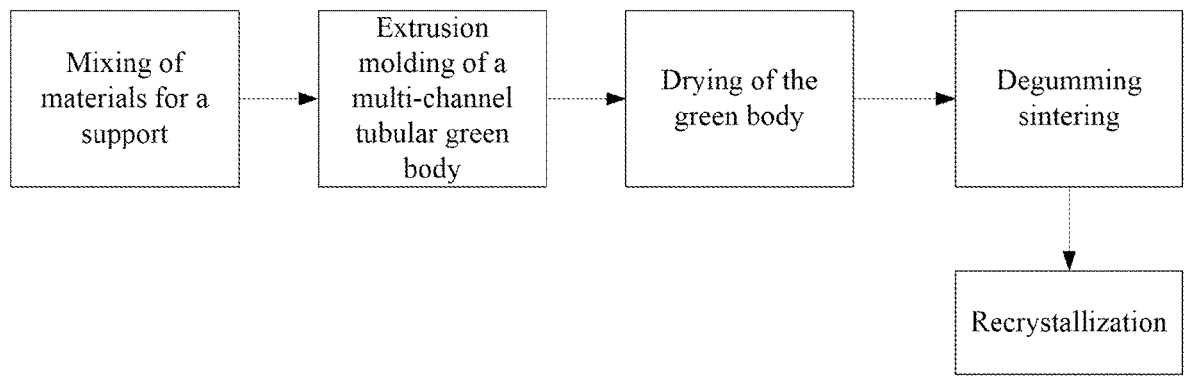
FIG. 4 is an example of a preparation process of a silicon carbide support in a preparation method of a ceramic filter membrane in an exemplary embodiment of the present disclosure.
Figure 5:
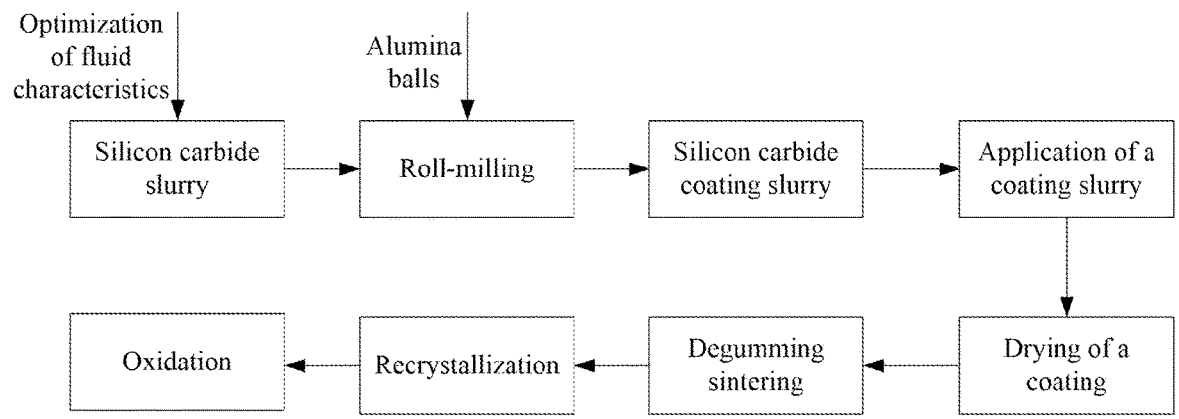
FIG. 5 is an example of separation layer preparation and carbon removal in a preparation method of a ceramic filter membrane in an exemplary embodiment of the present disclosure.

As shown in the processes of FIG. 4 and FIG. 5, in some embodiments of the present disclosure, the high-temperature sintering of the channel coating and the high-temperature sintering of the green body each include a degumming treatment. For example, under protection of an argon atmosphere, the green body or the coating is heated to 300° C. to 500° C. and kept at this temperature for 2 h to 5 h to allow degumming.

After the degumming is completed, the green body or the coating is heated once again to a holding temperature for recrystallization to allow recrystallization, and then furnace-cooled to room temperature.

In a specific embodiment, a sintering temperature for recrystallization of the channel coating is lower than a sintering temperature for recrystallization of the green body. Preferably, the sintering temperature for recrystallization of the channel coating is 1,600° C. to 2,000° C.; and the sintering temperature for recrystallization of the green body is 2,000° C. to 2,400° C.

Raw materials for the green body and slurry are commercially available products. Preferably, the silicon carbide powder I has a purity of greater than 98%, and the silicon carbide powder II has a purity of greater than 99%; and the silicon carbide powder III and the silicon carbide powder IV have a purity of greater than 99%.

The preparation method is described below with reference to specific examples.

Example 1

1) Molding and Sintering of a Silicon Carbide Green Body

Preparation of raw materials: A silicon carbide powder I, a silicon carbide powder II, MHEC, PEG, an acrylic polymer, and water were prepared according to a mass ratio of 60:18:6:2:2:12.

A median particle size of the silicon carbide powder I was 20 times a median particle size of the silicon carbide powder II. The silicon carbide powder I had a median particle size of 20 μm and a purity of greater than 98%; and the silicon carbide powder II had a median particle size of 1 μm and a purity of greater than 99%.

Mixing of raw materials: The prepared raw materials were mixed at room temperature (20° C. to 25° C.) to obtain a homogeneous mixture, where liquids were added first and then powders were added.

Molding: The mixture was subjected to extrusion molding in an extrusion molding machine under an extrusion pressure of 120 MPa to produce a multi-channel tubular green body.

Drying: The multi-channel tubular green body was dried for 24 h in a drying room with a relative humidity of 50% to 60% and a temperature of 25° C. to 30° C., during which hot air was introduced into channels of the green body at a flow rate of 2 m/s.

High-temperature sintering for recrystallization: The dried green body was sintered at a high temperature under protection of an argon atmosphere. Then the green body was heated to 500° C. and kept at this temperature for 2 h to allow degumming. After the degumming was completed, the green body was heated to 2,400° C. within 18 h, kept at this temperature for 5 h to allow recrystallization, and finally furnace-cooled to room temperature.

2) Application of a Silicon Carbide Coating

Preparation of a coating slurry: A silicon carbide powder III, a silicon carbide powder IV, MHEC, phthalate, an acrylic polymer dispersing agent, a siloxane polyether defoaming agent, an alcohol surfactant (PEG), and water were thoroughly mixed according to a mass ratio of a pH was controlled at 8 to 9, alumina balls with a diameter of 8 mm to mm were added, and roll-milling was conducted for 48 h to obtain the coating slurry.

A median particle size of the silicon carbide powder III was 5 times a median particle size of the silicon carbide powder IV.

The silicon carbide powder III had a median particle size of 1.5 μm and a purity of greater than 99%; and the silicon carbide powder IV had a median particle size of 0.3 μm and a purity of greater than 99%.

Application of a coating: The support was erected, and the coating slurry was introduced into channels of the support from a bottom at a rate of 80 mm/s; when the coating slurry reached a top of the support, the coating slurry was kept in the channels for 4 s; and the coating slurry in the channels of the support was finally released, such that the coating was formed through a capillary effect.

Drying of the coating: The prepared silicon carbide coating was dried for 24 h in a drying room with a relative humidity of 50% to 60% and a temperature of 25° C. to 30° C., during which hot air was introduced into the channels of the green body at a flow rate of 2 m/s.

High-temperature sintering for recrystallization: The dried silicon carbide coating was sintered at a high temperature under protection of an argon atmosphere. Then the silicon carbide coating was heated to 500° C. and kept at this temperature for 2 h to allow degumming. After the degumming was completed, the silicon carbide coating was heated to 1,600° C. within 20 h, kept at this temperature for 5 h to allow recrystallization, and finally furnace-cooled to room temperature.

Figure 7:
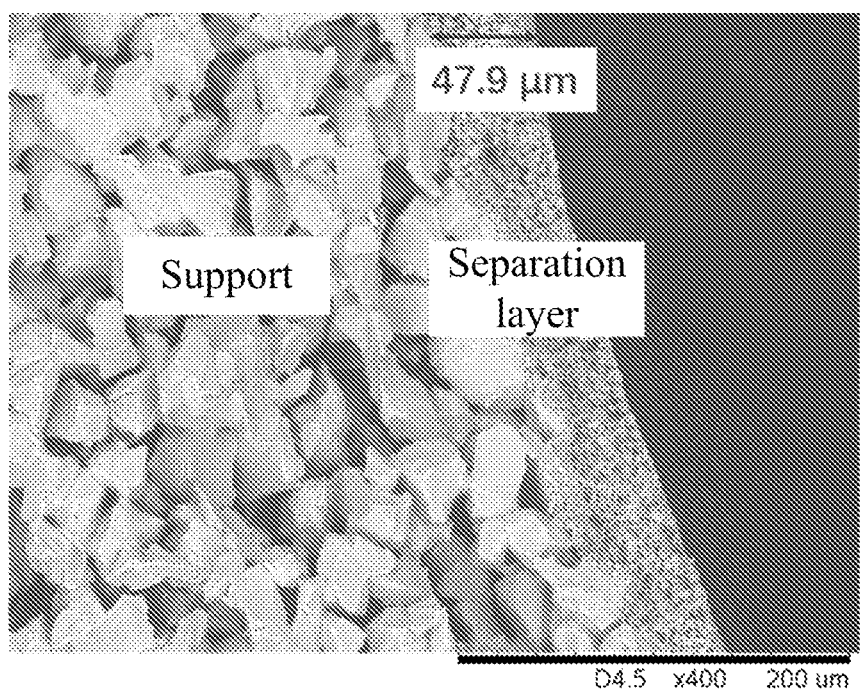
FIG. 7 is a schematic diagram of a silicon carbide ceramic filter membrane without an intermediate layer prepared by the preparation method of a ceramic filter membrane in Example 1.

Oxidation sintering With air introduced, the silicon carbide coating was subjected to oxidation sintering at 800° C. to remove residual carbon and improve a mechanical strength of the coating, and a resulting product was a 100% recrystallized silicon carbide coating. As shown in FIG. 7, the separation layer had a thickness of about 47.9 μm and was attached to a surface of the support, and there was no intermediate layer.

Figure 8:
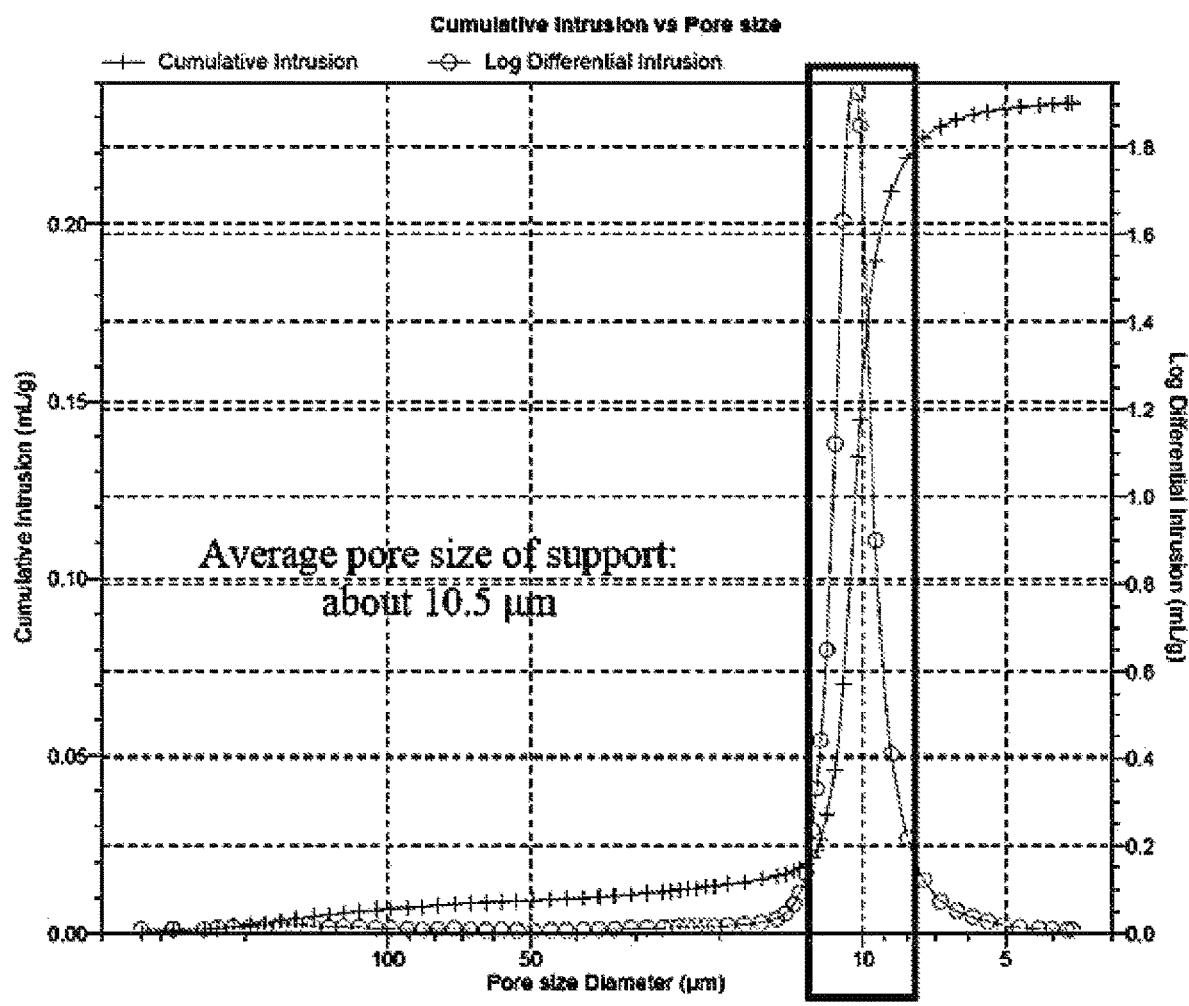
FIG. 8 shows pore size test results of a support in a silicon carbide ceramic filter membrane prepared by the preparation method of a ceramic filter membrane in Example 1, where an average pore size of the support is 10.5 μm.
Figure 9:
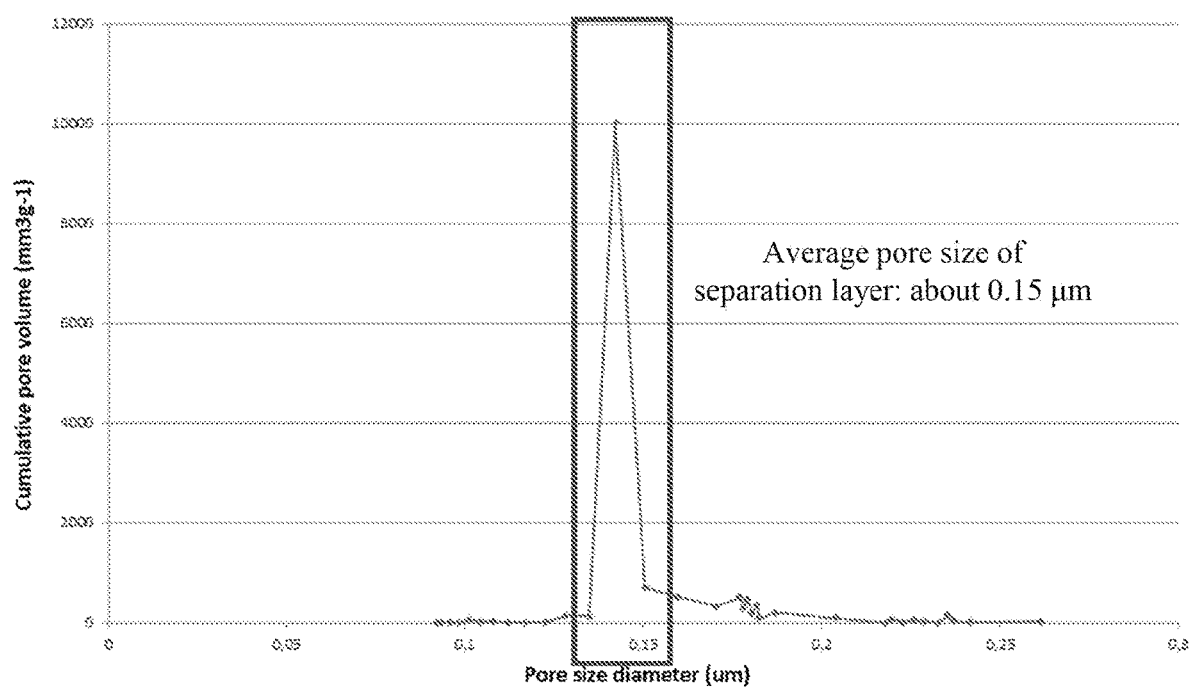
FIG. 9 shows pore size test results of a separation layer in a silicon carbide ceramic filter membrane prepared by the preparation method of a ceramic filter membrane in Example 1, where an average pore size of the separation layer is 0.15 μm.

As tested, a microporous structure of the support in the prepared ceramic filter membrane had an average pore size of 10.5 μm (as shown in FIG. 8), and a microporous structure of the separation layer had an average pore size of 0.15 μm (as shown in FIG. 9). In this example, a support with a large pore size was prepared, and on this basis, a separation layer with a small average pore size (0.15 μm) was coated and prepared, which could not only ensure a quality of filtered water, but also ensure a high flux based on the support with a large pore size.

Example 2

1) Molding and Sintering of a Silicon Carbide Green Body

Preparation of raw materials: A silicon carbide powder I, a silicon carbide powder II, MHEC, PEG, an acrylic polymer, and water were prepared according to a mass ratio of 65:15:5:1:1:13.

A median particle size of the silicon carbide powder I was 15 times a median particle size of the silicon carbide powder II. The silicon carbide powder I had a median particle size of 30 μm and a purity of greater than 98%; and the silicon carbide powder II had a median particle size of 2 μm and a purity of greater than 99%.

Mixing of raw materials: The prepared raw materials were mixed at room temperature (20° C. to 25° C.) to obtain a homogeneous mixture, where liquids were added first and then powders were added.

Molding: The mixture was subjected to extrusion molding in an extrusion molding machine under an extrusion pressure of 120 MPa to produce a multi-channel tubular green body.

Drying: The multi-channel tubular green body was dried for 24 h in a drying room with a relative humidity of 50% to 60% and a temperature of 25° C. to 30° C., during which hot air was introduced into channels of the green body at a flow rate of 2 m/s.

High-temperature sintering for recrystallization: The dried green body was sintered at a high temperature under protection of an argon atmosphere. Then the green body was heated to 500° C. and kept at this temperature for 2 h to allow degumming. After the degumming was completed, the green body was heated to 2,400° C. within 25 h, kept at this temperature for 5 h to allow recrystallization, and finally furnace-cooled to room temperature.

2) Application of a Silicon Carbide Coating

Preparation of a coating slurry: A silicon carbide powder III, a silicon carbide powder IV, MHEC, phthalate, an acrylic polymer dispersing agent, a siloxane polyether defoaming agent, an alcohol surfactant (PEG), and water were thoroughly mixed according to a mass ratio of a pH was controlled at 7 to 8, alumina balls with a diameter of 8 mm to mm were added, and roll-milling was conducted for 48 h to obtain the coating slurry.

A median particle size of the silicon carbide powder III was 5 times a median particle size of the silicon carbide powder IV.

The silicon carbide powder III had a median particle size of 1.5 μm and a purity of greater than 99%; and the silicon carbide powder IV had a median particle size of 0.3 μm and a purity of greater than 99%.

Application of a coating: The support was erected, and the coating slurry was introduced into channels of the support from a bottom at a rate of 80 mm/s; when the coating slurry reached a top of the support, the coating slurry was kept in the channels for 3 s; and the coating slurry in the channels of the support was finally released, such that the coating was formed through a capillary effect.

Drying of the coating: The prepared silicon carbide coating was dried for 24 h in a drying room with a relative humidity of 50% to 60% and a temperature of 25° C. to 30° C., during which hot air was introduced into the channels of the green body at a flow rate of 2 m/s.

High-temperature sintering for recrystallization: The dried silicon carbide coating was sintered at a high temperature under protection of an argon atmosphere. Then the silicon carbide coating was heated to 500° C. and kept at this temperature for 2 h to allow degumming. After the degumming was completed, the silicon carbide coating was heated to 1,800° C. within 25 h, kept at this temperature for 5 h to allow recrystallization, and finally furnace-cooled to room temperature.

Oxidation sintering With air introduced, the silicon carbide coating was subjected to oxidation sintering at 800° C. to remove residual carbon and improve a mechanical strength of the coating, and a resulting product was a 100% recrystallized silicon carbide coating.

Figure 10:
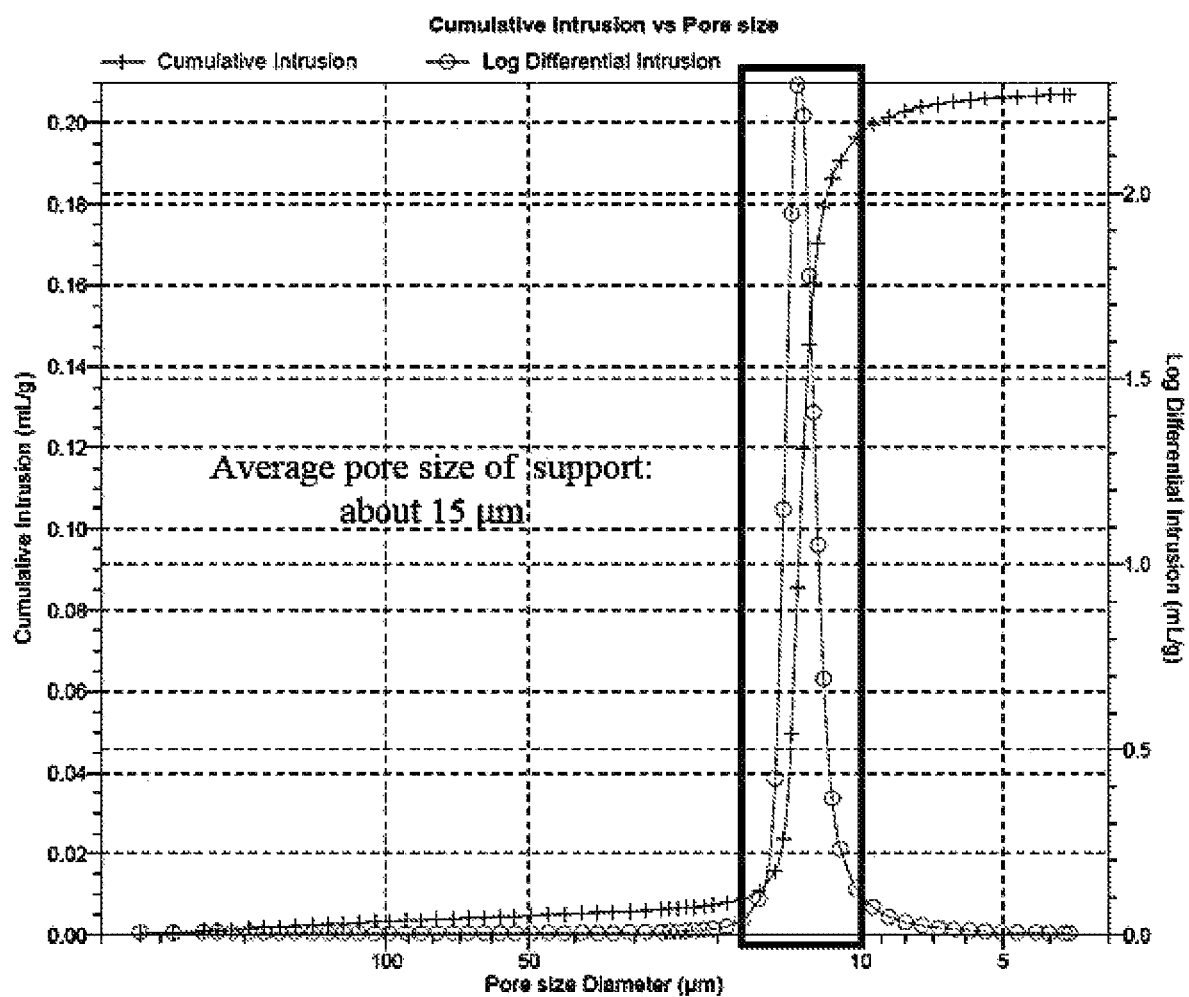
FIG. 10 shows pore size test results of a support in a silicon carbide ceramic filter membrane without an intermediate layer prepared by the preparation method of a ceramic filter membrane in Example 2, where an average pore size of the support is 15 μm.
Figure 11:
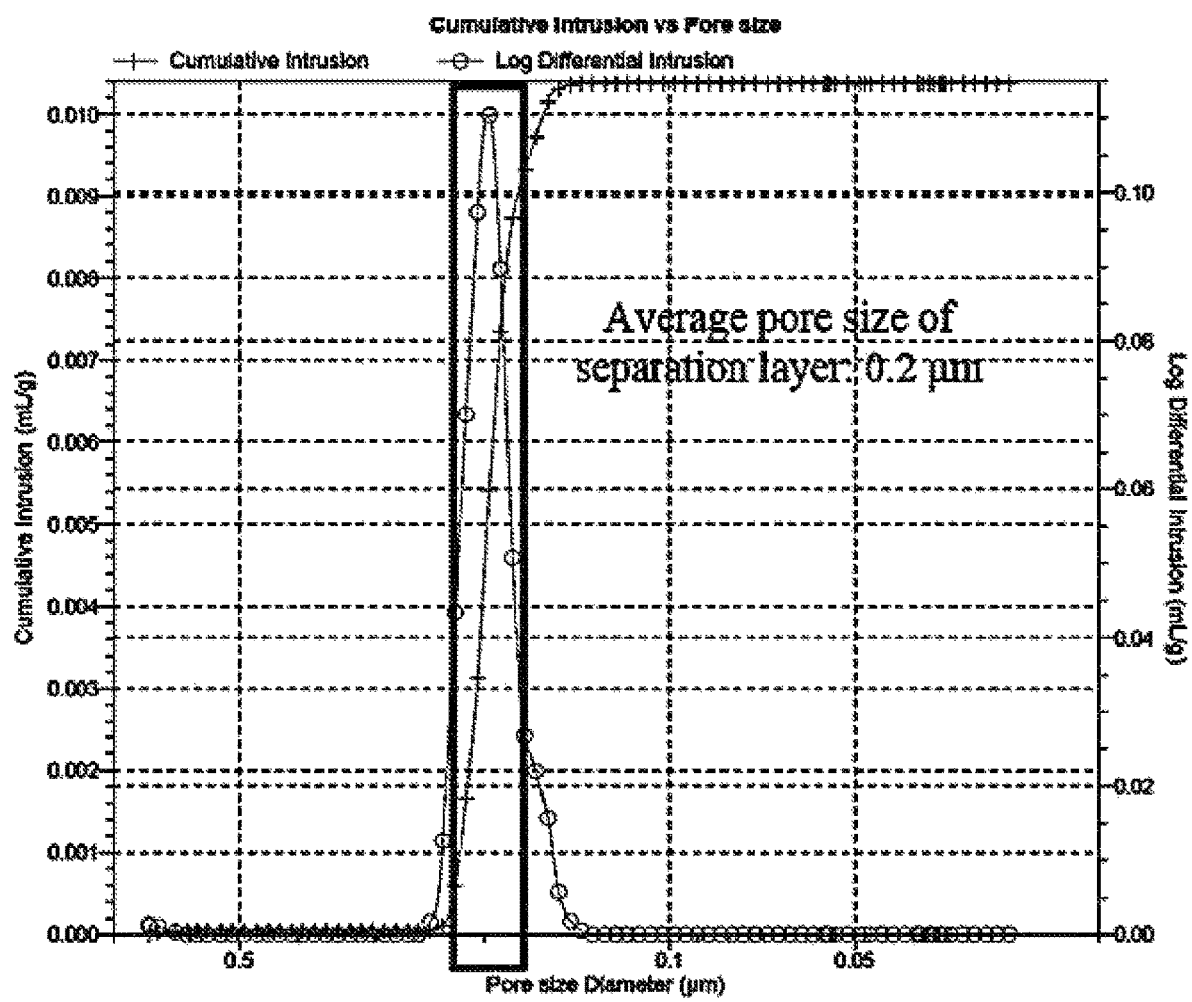
FIG. 11 shows pore size test results of a separation layer in a silicon carbide ceramic filter membrane prepared by the preparation method of a ceramic filter membrane in Example 2, where an average pore size of the separation layer is 0.2 μm.

As tested, a microporous structure of the support in the prepared ceramic filter membrane had an average pore size of 15 μm (as shown in FIG. 10), a microporous structure of the separation layer had an average pore size of 0.2 μm (as shown in FIG. 11), and there was no intermediate layer.

The ceramic filter membranes prepared in Examples 1 and 2 were tested. Test results showed that the microporous structure of the support in the prepared ceramic filter membrane had an average pore size of 10 μm or more (as shown in FIG. 8 and FIG. 10), and the microporous structure of the separation layer had an average pore size of 0.2 μm or less (as shown in FIG. 9 and FIG. 11), indicating the preparation of a support with a large pore size and the coating and preparation of a separation layer with a small pore size on this basis. The technique of the present disclosure is particularly suitable for preparation of a ceramic filter membrane in which a pore size of micropores in a separation layer is 20 times or more different from a pore size of micropores in a support. Through the raw materials and preparation process in the above example, a silicon carbide ceramic filter membrane in which an average pore size of micropores in a support is 10 μm or more and an average pore size of micropores in a separation layer is 0.2 μm or less (preferably, an average pore size of micropores in a separation layer can be controlled to be 0.15 μm to 0.2 μm) can be prepared, that is, a low-cost and high-flux ceramic filter membrane can be prepared.

The silicon carbide ceramic filter membrane prepared in Example 1 of the present disclosure was tested, and a ceramic filter membrane with a traditional sandwich structure that had a similar average pore size (0.15 μm) was selected and compared with the ceramic filter membrane prepared by the present disclosure. Pure water fluxes of the traditional silicon carbide membrane (with a sandwich structure) and the novel silicon carbide membrane (without an intermediate layer) were as follows: 3,000 LMH/bar vs 4,000 LMH/bar, indicating that a flux of the ceramic filter membrane prepared by the present disclosure was significantly improved by 30% or more. According to pore test results, the ceramic filter membrane prepared by the present disclosure had a porosity of 42% or more, and could allow high-flux filtration.

The ceramic filter membrane prepared in Example 1 was subjected to a strength test. Test results showed that a separation layer (namely, a coating) in the ceramic filter membrane had a high mechanical strength, with a bend strength of 25 MPa or more. According to results of a plurality of tests for the membrane, a bend strength of the separation layer can be maintained at about 35 MPa.

Although the present disclosure is described as above with preferred examples, the present disclosure is not limited to the preferred examples. Those of ordinary skill in the art to which the present disclosure belongs may make various changes and modifications to the present disclosure without departing from the spirit and scope of the present disclosure. Therefore, the protection scope of the present disclosure should be subject to the claims.

What is claimed is:

1. A preparation method of a high-flux silicon carbide ceramic filter membrane, comprising the following steps:
(1) mixing a silicon carbide powder having a first particle size mismatch ratio with a first additive and water, subjecting a resulting mixture to an extrusion molding to obtain a multi-channel tubular green body, and sintering the multi-channel tubular green body at a first temperature for a recrystallization to obtain a support having a microporous structure with a first average pore size on a wall of each of the channels, wherein the silicon carbide powder having the first particle size mismatch ratio comprises a first silicon carbide powder and a second silicon carbide powder, and a median particle size of the first silicon carbide powder is 5 to 30 times a median particle size of the second silicon carbide powder, the first additive comprises a binder, a plasticizer, and a dispersing agent, the binder is methyl hydroxyethyl cellulose or polyvinyl alcohol, the plasticizer is polyethylene glycol, and the dispersing agent is an acrylic polymer, the first silicon carbide powder, the second silicon carbide powder, the binder, the plasticizer, the dispersing agent, and the water are in a mass ratio of (50-75):(10-20):(4-8):(1-3):(1-3):(10-20);

(2) erecting the support, and introducing a coating slurry into channels from a bottom of the support obtained in step (1); when the coating slurry reaches a top of the support, keeping the coating slurry in the channels for a predetermined time; and releasing the coating slurry in the channels to form a channel coating, wherein the coating slurry has a pH of 6 to 10, and particles of the coating slurry and a surface of the support carry like charges;

(3) drying the channel coating obtained in step (2);

(4) under a protection of an inert atmosphere, sintering the channel coating at a second temperature to form a microporous structure with a second average pore size to produce a separation layer; and (5) subjecting the separation layer obtained in step (4) to an oxidation sintering to remove residual carbon.

2. The preparation method of the high-flux silicon carbide ceramic filter membrane according to claim 1, wherein the median particle size of the first silicon carbide powder is 10 μm to 30 μm; and the median particle size of the second silicon carbide powder is 0.5 μm to 6 μm.

3. The preparation method of the high-flux silicon carbide ceramic filter membrane according to claim 1, wherein before the multi-channel tubular green body is sintered at the first temperature in step (1), the preparation method further comprises: drying the multi-channel tubular green body.

4. The preparation method of the high-flux silicon carbide ceramic filter membrane according to claim 1, wherein in step (2), the coating slurry is prepared by mixing a silicon carbide powder having a second particle size mismatch ratio, a second additive, and water; and the silicon carbide powder having the second particle size mismatch ratio comprises a third silicon carbide powder and a fourth silicon carbide powder, and a median particle size of the third silicon carbide powder is 3 to 8 times a median particle size of the fourth silicon carbide powder.

5. The preparation method of the high-flux silicon carbide ceramic filter membrane according to claim 4, wherein the median particle size of the third silicon carbide powder is 0.5 μm to 6 μm; and the median particle size of the fourth silicon carbide powder is 0.1 μm to 3 μm.

6. The preparation method of the high-flux silicon carbide ceramic filter membrane according to claim 4, wherein the second additive comprises a binder, a plasticizer, a dispersing agent, a defoaming agent, and a surfactant; and the third silicon carbide powder, the fourth silicon carbide powder, the binder, the plasticizer, the dispersing agent, the defoaming agent, the surfactant, and the water are in a mass ratio of (5-15):(5-15):(3-10):(5-15):(0-1.5):(0-1.5):(1-5):(50-80).

7. The preparation method of the high-flux silicon carbide ceramic filter membrane according to claim 4, wherein before being introduced into the channels, the coating slurry is first pretreated as follows:
adding alumina balls with a diameter of 8 mm to 10 mm, and conducting roll-milling for 12 h to 48 h.

8. The preparation method of the high-flux silicon carbide ceramic filter membrane according to claim 1, wherein the coating slurry is introduced into the channels at a rate of 20 mm/s to 100 mm/s.

9. The preparation method of the high-flux silicon carbide ceramic filter membrane according to claim 1, wherein in step (2), the predetermined time is 3 s to 15 s.

10. The preparation method of the high-flux silicon carbide ceramic filter membrane according to claim 1, wherein in step (1) the sintering of the multi-channel tubular green body at the first temperature further comprises a degumming treatment or in step (4) the sintering of the channel coating at the second temperature further comprises a degumming treatment.

11. The preparation method of the high-flux silicon carbide ceramic filter membrane according to claim 1, wherein in step (1), the multi-channel tubular green body is sintered at 2,000° C. to 2,400° C.

12. The preparation method of the high-flux silicon carbide ceramic filter membrane according to claim 1, wherein the channel coating is sintered at 1,600° C. to 2,000° C.

13. A high-flux silicon carbide ceramic filter membrane prepared by the preparation method of the high-flux silicon carbide ceramic filter membrane according to claim 1.

14. The high-flux silicon carbide ceramic filter membrane according to claim 13, wherein the first average pore size is 10 μm or more, and the second average pore size is 0.15 μm to 0.2 μm.

* * * * *